United States Patent
Leutner

[11] Patent Number: 5,184,691
[45] Date of Patent: Feb. 9, 1993

[54] AUXILIARY POWER STEERING SYSTEM

[75] Inventor: Wilfried Leutner, Schwäbisch Gmünd, Fed. Rep. of Germany

[73] Assignee: Zahnradfabrik Friedrichshafen, AG., Friedrichshafen, Fed. Rep. of Germany

[21] Appl. No.: 640,360

[22] PCT Filed: Aug. 25, 1989

[86] PCT No.: PCT/EP89/01002
§ 371 Date: Jan. 29, 1991
§ 102(e) Date: Jan. 29, 1991

[87] PCT Pub. No.: WO90/02070
PCT Pub. Date: Mar. 8, 1990

[30] Foreign Application Priority Data

Aug. 26, 1988 [DE] Fed. Rep. of Germany ....... 3828946

[51] Int. Cl.⁵ .................................. B62D 5/06
[52] U.S. Cl. ..................... 180/132; 180/141
[58] Field of Search ............. 180/141, 132, 162, 142, 180/143

[56] References Cited
U.S. PATENT DOCUMENTS

| | | | |
|---|---|---|---|
| 4,232,708 | 11/1980 | Miller | 180/132 X |
| 4,332,303 | 6/1982 | de Maight | 180/132 |
| 4,541,499 | 9/1985 | Yanai et al. | 180/142 |
| 4,798,256 | 1/1989 | Fassbender | 180/141 X |
| 4,811,806 | 3/1989 | Lang | 180/141 |
| 4,815,551 | 3/1989 | Lang | 180/141 X |

FOREIGN PATENT DOCUMENTS 8910289 11/1989 World Int. Prop. O. .......... 180/132

Primary Examiner—Margaret A. Focarino
Assistant Examiner—Kevin Hurley
Attorney, Agent, or Firm—Albert M. Zalkind

[57] ABSTRACT

An auxiliary power steering system, especially for motor vehicles is provided with a pump (6), a servomotor (5) supplied with flow under pressure from a distribution valve (4) and with a quantity regulating valve (2), by means of which a regulated pressure is applied to a pressure control valve (3) for controlling pressure flow to cylinder chambers of a servomotor (5). The flow under regulated pressure is supplied to the servomotor cylinder chambers (17, 18) via the distribution valve (4) and initial pressure regulation is effected by the pressure control valve (3) wherein initial flow pressure is at less than the full pump operating pressure.

16 Claims, 2 Drawing Sheets

AUXILIARY POWER STEERING SYSTEM

BACKGROUND OF THE INVENTION

A servosteering system is described, for example, in DE-OS 29 06 047. Here, using an electrically-controlled three-way quantity regulator, oil volume is regulated for steering purposes as a function of the driving speed, as a result of which the steering forces are affected.

The disadvantage in this previously known steering system is that the steering forces depend on the quantity supplied to the servo-control unit. As the steering wheel is turned, however, oil flows to a speed responsive flow restrictor or throttle so that the oil quantity to the flow control edge of a control valve of the steering unit decreases as the steering speed increases. Thus, the effect of throttle variation requires more manual steering force for the same steering pressure in the steering servomotor. Accordingly, the steering force depends on the steering speed. This has a very disturbing effect, especially in case of a partially throttled quantity because the servomotor steering force increases greatly as the steering with increase of rate of turning of the steering wheel.

Another disadvantage is that the range within which the oil flow quantity can be varied is limited. It must not fall below a certain oil flow quantity; otherwise, the possible rate steering speed becomes too small. The maximum flow quantity must not be so big so that the pump will be overloaded and overheated. This means that the variation limits of the servomotor steering force is relatively limited at various driving speeds.

Another prior art arrangement is shown in DE-OS 32 03 450 in which surplus quantity of pressure medium will be kept approximately constant in the distribution valve in event of increased rotation of the steering wheel.

This construction provides a pressure valve separate from the distribution valve in which initial pressure regulation takes place. A regulating valve branches off in series with a fixed choke with an additional valve that can be adjusted parallel with the distribution valve. The choke characteristics of the additional valve is an image (in the two terminal segments of the adjusting distance) of the choke characteristics of the chokes that control a surplus volume beyond the servomotor.

However, in this arrangement effective changing of the oil flow cannot be accomplished so that a sufficient rate of steering would result.

DETAILED DESCRIPTION OF THE INVENTION

Figure 1:
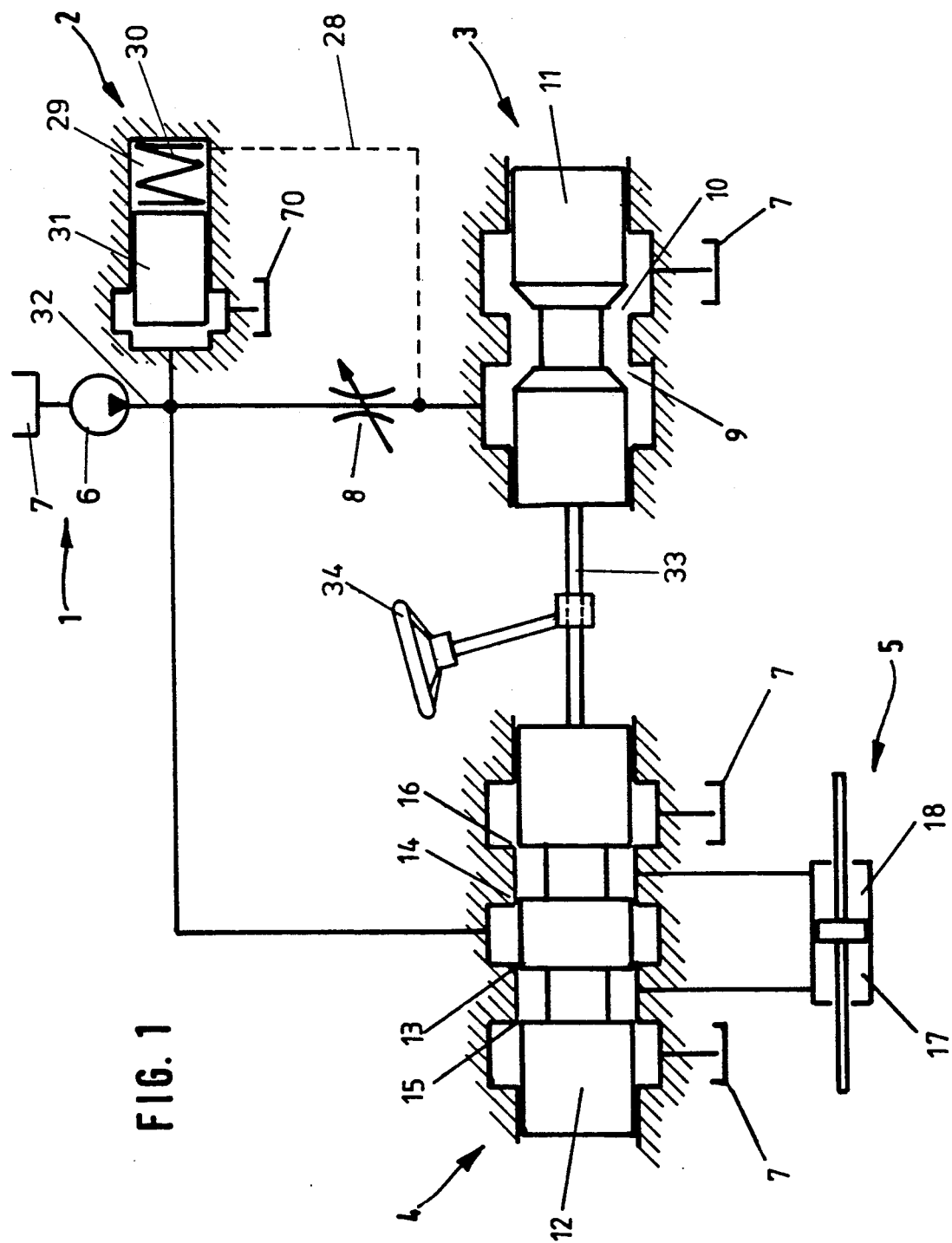
FIG. 1: a schematic illustration of the auxiliary power system according to the invention with a valve slide as distribution valve.

The practical example illustrated in FIG. 1 shows a hydraulic supply 1, a quantity regulating valve 2, a pressure valve 3, and a distribution valve 4 from which a hydraulic servomotor 5 is supplied with pressure medium as a function of the axial position of piston 12 of distribution valve 4.

The hydraulic supply 1 consists of a servopump 6 that suctions a pressure medium, generally oil, from a tank 7.

The quantity regulating valve 2 works in a known manner, whereby the pressure differential is kept constant via variable restrictor 8. In this way, the aperture of variable restrictor 8 determines the quantity that flows to pressure control valve 3.

Between shutter 8 and pressure valve 3 there branches off a control line 28 to a spring chamber 29 with a spring 30. Via the force of spring 30 and pressure in control line 28, the position of the regulating piston 31 of the quantity regulating valve 2 is regulated as a function of the prevailing pressure conditions whereby, in case of a correspondingly high pressure in pump line 32, a down-regulation takes place into a tank. If piston 11 of the pressure valve 3 is shifted out of its neutral position, then the free cross section is reduced in accordance with the direction of shifting of regulating edge 9 or 10. In this way, a pressure rise occurs upstream of the pressure control valve 3, whereby the adjusting travel for a certain pressure increases as the regulated quantity decreases. A longer adjusting travel at the same time also signifies greater activating forces.

The pressure at pump 6 is greater than the selected pressure from the pressure control valve by the differential pressure of the quantity regulating valve 2 (corresponding to the spring force). The pump pressure then goes to distribution valve 4. Piston 12 of distribution valve 4 is actuated with piston 11 of pressure control valve 3 for which purpose is used a connecting member 33 that is connected with both valves. Actuation takes place in the known manner by applying a moment to the manual steering wheel, whereby the valve travel is a direct function of the steering moment, i.e., rotation.

When in the neutral position, edges 13 and 14 in the distribution valve 4 are closed. Now, if piston 12 of distribution valve 4 is moved to the right, then edge 16 opens wider, as a result of which the right hand cylinder chamber 18 remains connected with tank 7. At the same time, edge 15 closes and edge 13 opens flow from pump 6 to cylinder chamber 17 of servomotor 5, whereupon hydraulic force amplification can take place.

Upon further adjustment of both pistons 11 and 12, there is a starting pressure regulation at edge 9 in pressure control valve 3 and cylinder chamber 17 is pressurized.

If both pistons 11 and 12 are shifted to the left, edges 14, 15, 16, and 10 work in an analogous fashion in order, in this case, to pressurize cylinder chamber 18 of servomotor 5 and, in return, connect cylinder chamber 17 to tank 7.

In the practical example of FIG. 1, distribution valve 4 can advantageously be made as a rotary valve. In this case, pressure control valve 3 can be integrated into the distribution valve in a space saving manner. For this purpose it is merely necessary to arrange, on the rotary valve, at different places along the circumference, the corresponding control edges for pressure medium distribution to the servomotor 5 and for regulation of the pressure rise by pressure control valve 3 along the circumference.

Figure 2:
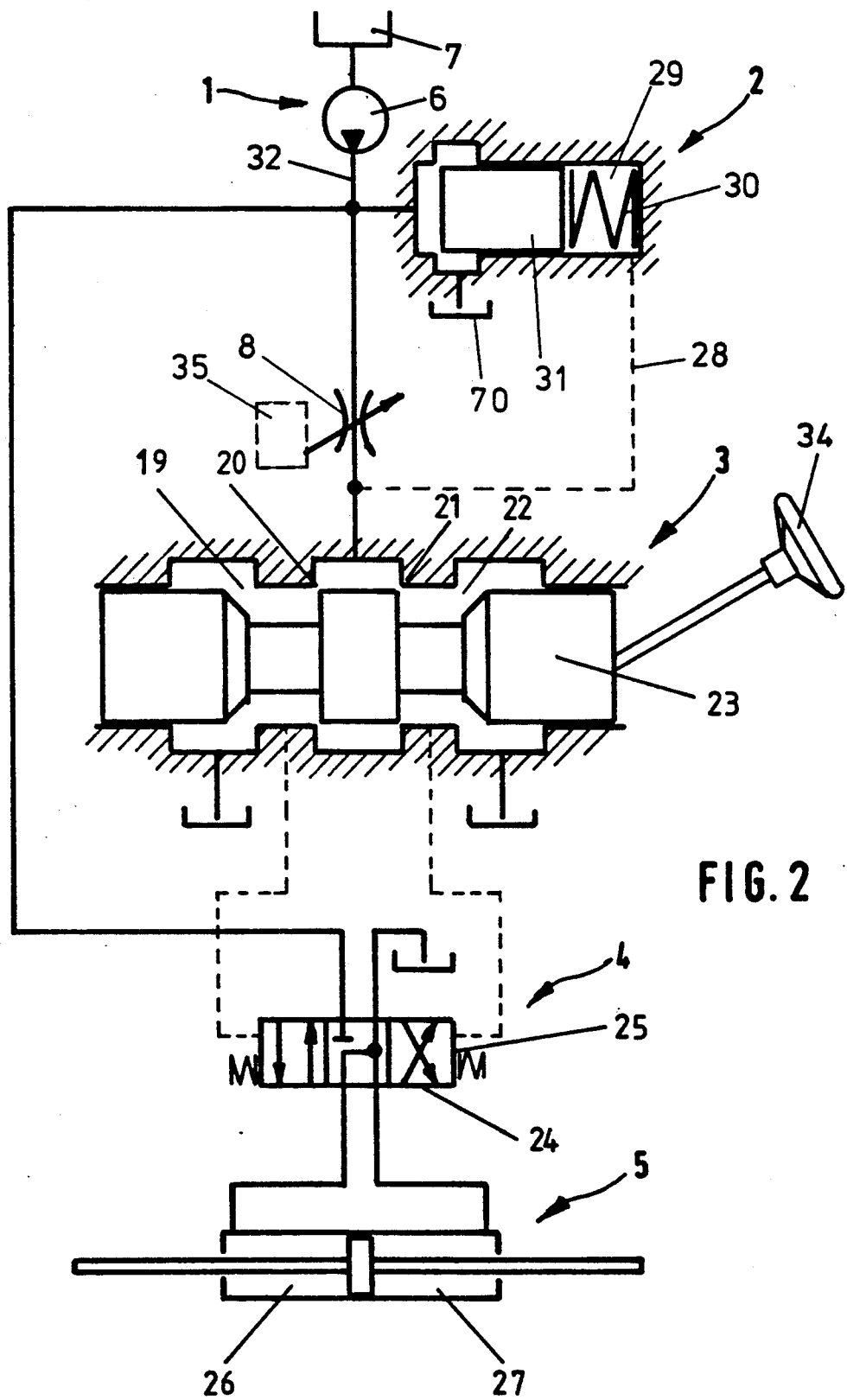
FIG. 2: an auxiliary power system according to the invention with a different design showing a 4/3-way valve as hydraulic distribution valve.

Corresponding to the practical example illustrated in FIG. 2, pressure control valve 3 is likewise connected via the quantity regulating valve 2 with the hydraulic supply 1. When piston 23 of pressure valve 3 is shifted, for example, to the right, edge 21 will first close the pressure control valve and will thus connect to the tank the right side 25 of rotatary valve 24 that is made as a pressure controlled 4/3-way valve. In case of a major shift of piston 23, edge 19 begins to close pressure control valve 3 and thus builds up pressure. This pressure shifts rotary valve 24 to the right whereupon a pressure connection is established between pump 6 and cylinder chamber 26 of servomotor 5 and, at the same time, cylinder chamber 27 is connected to tank 7.

In case of a shift of piston 23 of pressure control valve 3 to the left, the corresponding situation prevails, whereby rotary valve 24 likewise is rotated to the left and cylinder chamber 27 is supplied with pressure medium from pump 6 while cylinder chamber 26 is switched to tank 7.

If a compact design is desired, the quantity regulating valve can also be integrated into pump 6. Here, the regulating piston and the variable restrictor of a constant flow pump can be taken over unchanged, in that a pin is introduced into the variable restrictor by means of which variable restrictor 8 can be altered. It is merely necessary to make sure that the pump contains an additional pressure connection to the pressure chamber upstream of the variable restrictor.

The adjustment of variable restrictor 8 of the quantity regulating valve 2 can be accomplished, for example, with the help of an electromechanical converter 35.

The adjustment of the variable restrictor 8 can be accomplished as desired, for example, by way of the driving speed, the lateral acceleration, or other parameters with the help of an analysis electronics. Such devices are generally known, the electromechanical converter is illustrated in FIG. 2 merely with a broken line and its operating procedure together with the analysis electronics will not be covered in detail here.

We claim:

1. Auxiliary power steering system for motor vehicles comprising a pump (6) for pressurizing a servomotor (5); a distribution valve (4) for directional control of said servmotor;
   wherein the improvement comprises:
   pressure flow regulating means (2, 8) connected for pressure control of said pump and including a pressure control valve (3) connected to be operable by a steering wheel (34) and said control valve being connected downstream of said pressure flow regulating means.

2. Auxiliary power steering system according to claim 1, wherein said flow regulating means comprises a quantity regulating valve (2) responding to pump pressure, and connected and coacting therewith a variable restrictor (8) responsive to speed or lateral acceleration.

3. Auxiliary power steering system according to claim 2, wherein said quantity regulating valve (2) applies pressure to the variable restrictor (8) and thence to pressure control valve (3).

4. Auxiliary power steering system according to claim 1, wherein the distribution valve (4) and pressure control valve (3) are connected with each other by a common actuating shaft (33) operatively connected to a steering wheel (34).

5. Auxiliary power steering system according to claim 2, wherein the variable restrictor (8) is connected to said pressure control valve (3).

6. Auxiliary power steering system according to claim 1, wherein the distribution valve (4) and pressure valve (3) are arranged in a common housing.

7. Auxiliary power steering system according to claim 1, wherein the distribution valve (4) and pressure control valve (3) is a rotary valve and the distribution valve having a set of flow control edges (13, 14, 15, 16) and the pressure control valve (3) includes a set of flow control edges (9, 10), said edges of said valves being located separatedly axial on the circumference of the rotary valve.

8. Auxiliary power steering system according to claim 1, wherein said distribution valve is pressure actuated via connections to said pressure control valve.

9. Auxiliary power steering system for motor vehicles having a steering wheel (34), a pump (6) providing pressurized fluid to a servomotor (5), a distribution valve (4) for controlling pressure flow from said pump to said servomotor; the improvement comprising a pressure control valve (3) connected for actuation by said steering wheel and being connected to control pressure flow to said distribution valve, including pressure regulating means (2, 8) to control pressure connected to said pressure control pump valve.

10. Auxiliary power steering system according to claim 9, wherein said flow regulating means comprises a quantity regulating valve (2) responding to pump pressure, and a variable restrictor (8) responsive to speed or lateral acceleration.

11. Auxiliary power steering system according to claim 9, wherein said quantity regulating valve (2) applies pressure to the variable restrictor (8) and thence to pressure control valve (3).

12. Auxiliary power steering system according to claim 9, wherein the distribution valve (4) and pressure control valve (3) are connected with each other by a common actuating shaft (33) operatively connected to a steering wheel (34).

13. Auxiliary power steering system according to claim 9, wherein the variable restrictor (8) is connected to said pressure control valve (3).

14. Auxiliary power steering system according to claim 9, wherein the distribution valve (4) and pressure valve (3) are arranged in a common housing.

15. Auxiliary power steering system according to claim 9, wherein the distribution valve (4) and pressure control valve (3) is a rotary valve and the distribution valve having a set of flow control edges (13, 14, 15, 16) and the pressure control valve (3) includes a set of flow control edges (9, 10), said sets being located separatedly axial on the circumference of the rotary valve.

16. Auxiliary power steering system according to claim 15, wherein said distribution valve is pressure actuated via connections to said pressure control valve.

* * * * *